US008904195B1

(12) United States Patent
Rahat et al.

(10) Patent No.: US 8,904,195 B1
(45) Date of Patent: Dec. 2, 2014

(54) METHODS AND SYSTEMS FOR SECURE COMMUNICATIONS BETWEEN CLIENT APPLICATIONS AND SECURE ELEMENTS IN MOBILE DEVICES

(71) Applicant: Citibank, N.A., New York, NY (US)

(72) Inventors: Syed Rahat, Mason, OH (US); Wayne Browning, Loveland, OH (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 13/972,523

(22) Filed: Aug. 21, 2013

(51) Int. Cl.
*G06F 21/00* (2013.01)
*G06F 21/60* (2013.01)
*G06F 21/86* (2013.01)
*H04W 12/04* (2009.01)

(52) U.S. Cl.
CPC ............. *G06F 21/606* (2013.01); *H04W 12/04* (2013.01); *G06F 21/86* (2013.01)
USPC ........................................................ 713/194

(58) Field of Classification Search
None
See application file for complete search history.

(56) References Cited

U.S. PATENT DOCUMENTS

| 7,940,932 | B2 * | 5/2011 | Paksoy et al. ................. 380/247 |
| H002270 | H * | 6/2012 | Le Saint et al. ............... 713/168 |
| 8,417,643 | B2 | 4/2013 | Mardikar |
| 8,745,394 | B1 * | 6/2014 | Rahat et al. ................... 713/171 |
| 2004/0172369 | A1 * | 9/2004 | Persson ........................... 705/67 |
| 2004/0218762 | A1 * | 11/2004 | Le Saint et al. ............... 380/277 |
| 2006/0053302 | A1 * | 3/2006 | Yasaki et al. .................. 713/183 |
| 2006/0075259 | A1 * | 4/2006 | Bajikar et al. ................. 713/189 |
| 2007/0136360 | A1 * | 6/2007 | Randall et al. ................ 707/102 |
| 2010/0186076 | A1 * | 7/2010 | Ali et al. ............................ 726/9 |
| 2010/0318798 | A1 * | 12/2010 | Binding et al. ............... 713/170 |
| 2011/0053504 | A1 | 3/2011 | Corda |
| 2012/0137132 | A1 * | 5/2012 | Le Saint ........................ 713/171 |
| 2012/0159148 | A1 * | 6/2012 | Behren et al. ................. 713/150 |
| 2012/0297204 | A1 | 11/2012 | Buer |
| 2012/0300932 | A1 | 11/2012 | Cambridge et al. |
| 2012/0314865 | A1 | 12/2012 | Kitchen |
| 2012/0322371 | A1 | 12/2012 | Lee |
| 2012/0329388 | A1 | 12/2012 | Royston et al. |
| 2013/0019323 | A1 | 1/2013 | Arvidsson et al. |
| 2013/0024383 | A1 | 1/2013 | Kannappan |
| 2013/0041831 | A1 | 2/2013 | Das |

(Continued)

FOREIGN PATENT DOCUMENTS

EP          2237519 A1    10/2010

OTHER PUBLICATIONS

Schneier, Bruce. Applied Cryptography, 1996, John Wiley & Sons, 2nd Edition, p. 48.*

(Continued)

*Primary Examiner* — Michael R Vaughan
(74) *Attorney, Agent, or Firm* — John M. Harrington, Esq.; Johnson, Marcou & Isaacs, LLC

(57) ABSTRACT

Methods and systems for secure communication between a client application and a secure element on a mobile device involve, for example, encrypting a request including a randomly generated session key by the client application with a user's unique public key and sending the encrypted request to the secure element. The request message is decrypted with a user's unique private key on the secure element, a response message is encrypted with the session key retrieved from the decrypted request and sent to the client application, which decrypts the response with the session key.

24 Claims, 2 Drawing Sheets

(56) References Cited

U.S. PATENT DOCUMENTS

| | | |
|---|---|---|
| 2013/0054473 A1 | 2/2013 | Jan et al. |
| 2013/0073848 A1 | 3/2013 | Pelly et al. |
| 2013/0086375 A1 | 4/2013 | Lyne et al. |
| 2013/0132717 A1* | 5/2013 | Brand et al. ............ 713/156 |
| 2013/0145455 A1* | 6/2013 | Vijayshankar et al. ...... 726/16 |
| 2014/0059357 A1* | 2/2014 | Andersson et al. ......... 713/189 |

OTHER PUBLICATIONS

Cheng et al., "A Secure and Practical Key Management Mechanism for NFC Read-Write Mode," Journal of Computational Information Systems 7:11 (2011) 3819-3828, available at http://www.Jofcis.com, Nov. 2011, pp. 1-10.

Kleebauer, P., "Secure Communication Between Web Browsers and NFC Targets by the Example of an E-Ticketing Concept," University of Applied Sciences Hagenberg, Near Field Communication, Research Lab, Hagenberg, EC-Web'08, Sep. 3, 2008, pp. 1-16.

Pourghomi, P. et al., "Challenges of Managing Secure Elements Within the NFC Ecosystem," Internet Technology and Secure Transactions, The 7th International Conference for Internet Technology and Secured Transactions (ICITST-2012), Dec. 10-12, 2012, pp. 720-725.

Pourghomi, P. et al., "Managing NFC Payment Applications Through Cloud Computing," Internet Technology and Secure Transactions, The 7th International Conference for Internet Technology and Secured Transactions (ICITST-2012), Dec. 10-12, 2012, pp. 772-777.

\* cited by examiner

METHODS AND SYSTEMS FOR SECURE COMMUNICATIONS BETWEEN CLIENT APPLICATIONS AND SECURE ELEMENTS IN MOBILE DEVICES

FIELD OF THE INVENTION

The present invention relates generally to the field of secure electronic communications, and more particularly to methods and systems for secure communications between client applications and secure elements in mobile devices.

BACKGROUND OF THE INVENTION

Increasingly, mobile devices, such as mobile phones, are being equipped with a secure element in the hardware of the phone which communicates with client applications on the phone, for example, for purposes of authentication. Currently, secure elements are found primarily in Near Field Communication (NFC)-enabled mobile phones. Such secure elements may be, for example, tamper-resistant integrated circuit (IC) chips capable of securely hosting applications and their confidential and cryptographic data. Secure elements may also be subscriber identity module (SIM)-card based. Thus, there may be a client application on the mobile phone and a secure element that is a physical IC chip, or that is SIM card-based, in the phone. Currently, communications originating from the client application and the secure element are not typically encrypted.

A simple example involving such a mobile phone may involve a user purchasing goods in a retail establishment with the user's NFC-enabled mobile phone. An authentication process on the user's mobile phone may confirm a communication between the client application on the phone that performs payment and the secure element (e.g., an NFC chip). As noted, such communications within the user's mobile phone are not currently encrypted. Moreover, there is currently no known solution that can provide payload encryption, non-repudiation and integrity checks for messages exchanged between the mobile application and the secure element without storing private keys or other secret keys in the mobile application which are consequently vulnerable, for example, to "sniffing" tools.

There is a current need for methods and systems for secure communications between a client application on a mobile device, such as a mobile phone, and a secure element, such as an NFC chip, on the mobile device that does not involve storing secret keys on the client application.

SUMMARY OF THE INVENTION

Embodiments of the invention employ computer hardware and software, including, without limitation, one or more processors coupled to memory and non-transitory, computer-readable storage media with one or more executable computer application programs stored thereon which instruct the processors to perform the methods and systems for secure communications between a client application and a secure element described herein.

Embodiments of the invention provide methods and systems for secure communication between a client application and a secure element on a mobile device that involve, for example, encrypting, using a mobile device processor, a request message consisting at least in part of a randomly generated session key by the client application using a user's unique public key stored on the client application and sending the encrypted request message to a secure element processor on the mobile device; decrypting, using the secure element processor, the request message with a user's unique private key stored on the secure element; encrypting, using the secure element processor, a response message with the randomly generated session key retrieved from the decrypted request message and sending the encrypted response message to the client application; and decrypting, using the mobile device processor, the response message with the randomly generated session key.

In aspects of embodiments of the invention, encrypting the request message with the user's unique key may involve, for example, encrypting the request message with the user's unique key stored with the client application on the mobile device in advance of the secure communication. In other aspects, encrypting and sending the encrypted request message may involve, for example encrypting and sending a secure authentication request message to the secure element processor on the mobile device. In further aspects, encrypting and sending the encrypted request message may involve, for example, encrypting and sending a secure password reset or password change request message to the secure element processor on the mobile device.

In further aspects of embodiments of the invention, encrypting and sending the encrypted request message may involve, for example, encrypting and sending the encrypted request message in response to receiving entry of a user's action by the client application. In still further aspects, encrypting and sending the encrypted request message in response to receiving entry of the user's action may involve, for example, encrypting and sending the encrypted request message in response to receiving entry of a user's log-on request by the client application. In other aspects, encrypting and sending the encrypted request message in response to receiving entry of the user's action may involve, for example, encrypting and sending the encrypted request message in response to receiving entry of a unique user identifier by the client application.

In additional aspects of embodiments of the invention, encrypting and sending the request message consisting at least in part of the randomly generated session key may involve, for example, generating and temporarily storing the randomly generated session key in memory of the mobile device. In further aspects, generating and temporarily storing the randomly generated session key may involve, for example, generating and storing a random 128-bit number for use as the session key in memory of the mobile device. In other aspects encrypting and sending the request message consisting at least in part of the randomly generated session key, may involve, for example, creating the request message consisting at least in part of the randomly generated session key, a request message payload, and a hash of the client application In other aspects of embodiments of the invention, sending the encrypted request message to the secure element processor may involve, for example, sending the encrypted request message to an applet on the secure element processor. In additional aspects, the secure element may comprise, for example, a physical tamper-resistant integrated circuit chip component of the mobile device. In further aspects, decrypting the request message with the user's private key may involve, for example, decrypting the request message with the private key of a public-private key pair unique to the user.

In still other aspects of embodiments of the invention, decrypting the request message with the user's private key stored on the secure element may involve, for example, decrypting the request message with the private key that was stored on the secure element using a trusted service manager.

In still further aspects, decrypting the request message with the private key that was stored on the secure element using the trusted service manager may involve, for example, decrypting the request message with the private key that was stored on the secure element using the trusted service manager as a secure communication hub between the secure element and a financial institution.

In further aspects of embodiments of the invention, decrypting the request message with a user's private key stored on the secure element may involve, for example, decrypting the request message with the user's unique private key for the particular user stored on the secure element along with a hash value of the client application binaries and a user's identifier. In still further aspects, decrypting the request message with a user's private key stored on the secure element may involve, for example, decrypting the request message with a user's private key stored on the secure element by an applet in the secure element.

In additional aspects of embodiments of the invention, encrypting the response message with the randomly generated session key retrieved from the decrypted request message may involve, for example, encrypting the response message with the randomly generated session key by an applet in the secure element. In further aspects, encrypting the response message with the randomly generated session key may involve, for example, encrypting the response using a 128-bit randomly generated session key retrieved from the decrypted request message. In other aspects sending the encrypted response message to the client application, may involve, for example, sending the encrypted response message to the client application on the mobile device processor by an applet on the secure element.

In other aspects of embodiments of the invention, decrypting the response message with the randomly generated session key may involve, for example, decrypting the response message with the randomly generated session key temporarily stored by the client application in volatile memory of the mobile device. In additional aspects, decrypting the response message may involve, for example, decrypting an affirmative response message with the randomly generated session key and allowing a user's log-on request based on the affirmative response message. In further aspects, decrypting the response message may involve, for example, decrypting a negative response message with the randomly generated session key and denying a user's log-on request based on the negative response message. Further aspects may involve, for example, generating and encrypting a close communication command by the client application using the user's public key and sending the encrypted command to an applet in the secure element.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Figure 1:
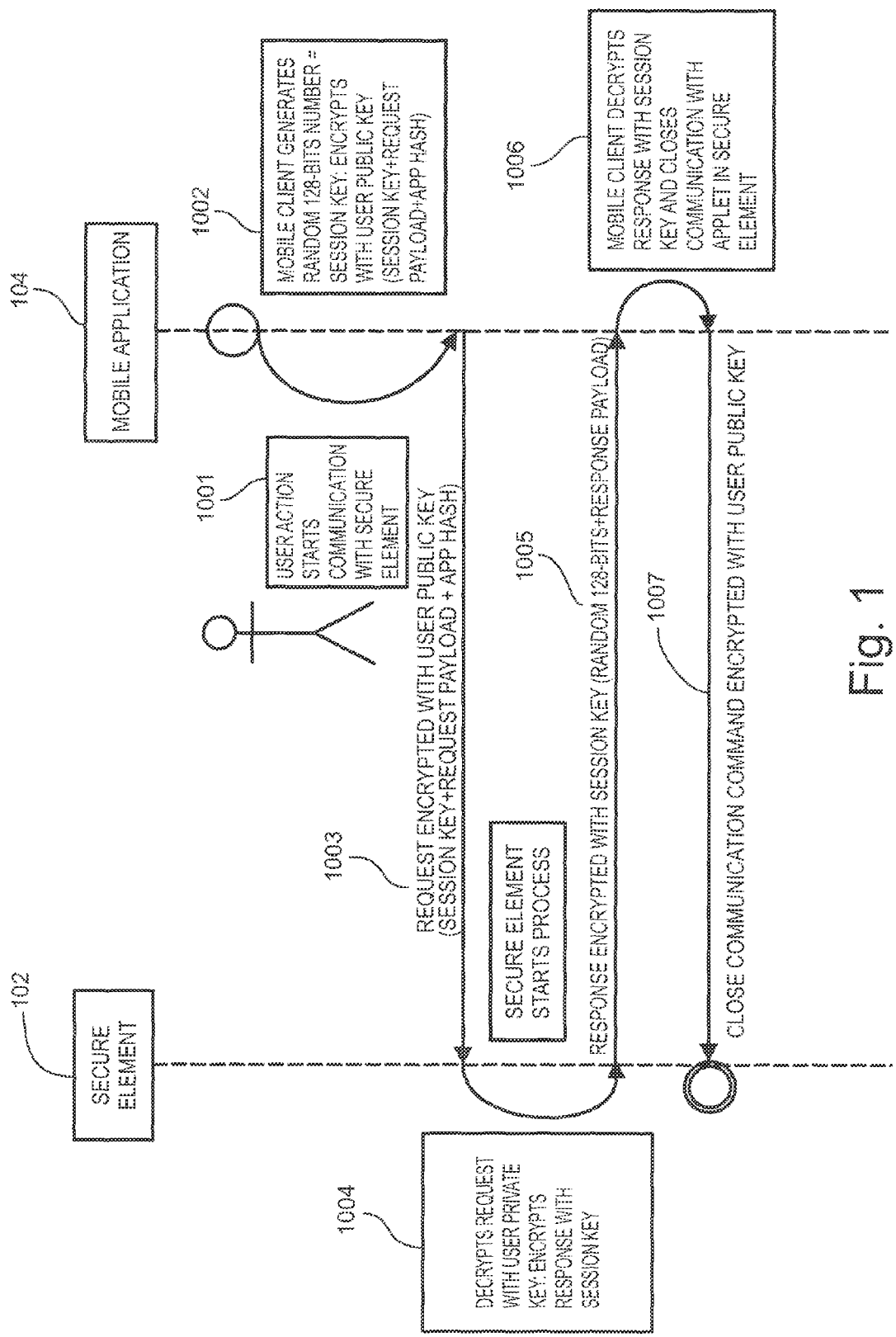
FIG. 1 is a diagram that illustrates a use case for secure communication between the mobile application and the secure element in a mobile device for embodiments of the invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention utilize one or more special purpose computer software application program processes, each of which is tangibly embodied in a physical storage device executable on one or more physical computer hardware machines, and each of which is executing on one or more of the physical computer hardware machines (each, a "computer program software application process"). Physical computer hardware machines employed in embodiments of the invention comprise, for example, input/output devices, motherboards, processors, logic circuits, memory, data storage, hard drives, network connections, monitors, and power supplies. Such physical computer hardware machines include, for example, user machines and server machines that may be coupled to one another via a network, such as a local area network, a wide area network, or a global network through telecommunications channels which may include wired or wireless devices and systems.

Embodiments of the invention provide, for example, session-based secure communication between a client application, such as a mobile application, and a secure element, such as an NFC chip, on a mobile device. An aspect of embodiments of the invention may involve, for example, a mobile application that calls the secure element to initiate a secure session, such as a secure authentication session, and a session management protocol. Such aspect eliminates a need for storing private or other secret keys on the mobile application and at the same time provides payload encryption, non-repudiation and integrity for sensitive message traffic exchanged between the mobile application and the secure element. While the examples presented herein may relate to a secure element in the form of an NFC chip in an NFC-enabled mobile device, it is to be understood that embodiments of the invention are not limited to NFC implementation.

Such sensitive messages between the mobile application and the secure element may include, for example, password reset or password change. In such messages, the user may enter his or her password on the mobile application, whereupon the password is transmitted from the mobile application to the secure element. Currently, the user's password is sent in the clear from the mobile application to the secure element. Thus, it is currently possible for an unauthorized person, such as a hacker, to deploy, for example, a "sniffing" tool that may "sniff" the user's password in the clear and make the user's password available to the hacker.

Embodiments of the invention protect communications originating from the mobile application to the secure element by encrypting such communications in a manner that provides confidentiality, non-repudiation and integrity without storing a private or secret key locally in the mobile application. Embodiments of the invention also minimize any impact caused by a key compromise in the secure element, for example, by assuring that the user's password is encrypted when it is transmitted from the mobile application to the secure element. In addition, embodiments of the invention provide non-repudiation, which assures that a message was sent and received by the parties claiming to have sent and received the message.

Currently, a private key may be downloaded to a mobile application, for example, bundled with the client application or from any back-end system. Embodiments of the invention eliminate the need for storing private keys on the mobile application. As noted, mobile devices have various physical components, one of which may be a secure element. In embodiments of the invention, the secure element is a physical component of the mobile device itself that is a secure area where a private key unique to a particular user may be stored. Thus, in embodiments of the invention, the private key is stored in a secure area where it cannot be accessed by anyone. Further, because the private key stored in the secure element is unique to each user, even in the unlikely event the secure element and private key stored in the secure element are compromised by an unauthorized person, no other users' keys may be compromised.

In embodiments of the invention, a private key may be stored on the secure element using a trusted service manager (TSM). The TSM may be, for example, a server that functions as a secure communication hub between the secure element and a third party, such as a financial institution. Thus, if the financial institution wishes to install anything securely in the vault referred to as the secure element, the financial institution may communicate with the TSM which may, in turn, communicate with the secure element on a secure channel.

The communication between the TSM and the secure element may employ an approved standard, such as Secure Protocol 2 (SCP02). Such an approved standard may be used in communications between the TSM and the secure element, for example, to securely install private or other secret keys, as well as any other sensitive information, on the secure element. In a key download aspect of embodiments of the invention, the financial institution may communicate with the TSM, whereupon the TSM may open the secure channel with the secure element and store the keys in the secure element. The entire path of such keys to the secure element over the secure channel is likewise secure, and it is not possible for an unauthorized party to access the keys.

In embodiments of the invention, unique private and pubic keys of a key pair may be generated for each user in advance of deployment, and the mobile application for a particular user may be packaged with the user's public key. In addition, a hash value of the mobile application binaries may be generated in advance of deployment. The hash values may be generated, for example, offline in a location where binaries are being created, for example, by the financial institution.

Such hash values may be a part of a message exchange between the mobile application and the secure element. It is to be understood that binaries may include, for example, files that contain compiled computer code also known as object files. Further, the unique private key for the particular user, along with the hash value of the application binaries and the user's PIN and password, may be securely stored in an applet in the secure element using the TSM. As noted, the mobile application has the unique public key for the user, which is not intended to be secure.

FIG. 1 is a diagram that illustrates a use case for secure communication between the mobile application and the secure element in a mobile device for embodiments of the invention. Referring to FIG. 1, the secure element 102 comprises a secure vault component of the mobile device, and the mobile application 104 comprises the binaries for a downloadable application running on the mobile phone. The mobile application 104 may communicate, for example, with a back-end system, such as a back-end server of a financial institution, as well as with the secure element 102 on the mobile device. For example, the mobile application 104 may comprise a mobile wallet application, and the user may perform a function in the wallet application that requires a communication with the secure element 102, as well as a back-end system.

Referring to FIG. 1, at 1001, a user's action may initiate the communication between the mobile application 104 and the secure element 102. For example, a user may wish to log into an application or run an application using his or her mobile application 104 and the secure element 102. In order to initiate the communication, the user may enter his password and/or PIN on the mobile application 104, and entry of the user's password and/or PIN may trigger the communication with the secure element 102.

Referring further to FIG. 1, at 1002, the mobile application 104 may generate and temporarily store a random 128-bit number in volatile memory of the mobile device for use as a session key for encryption of communications from the secure element 102. In addition, the mobile application 104 may also create a request string for the applet in the secure element 102 consisting of the session key, a request payload, and the application hash and encrypt the request with the user's public key. Thereafter, at 1003, the mobile application 104 may send the encrypted request to the applet in the secure element 102.

Referring again to FIG. 1, at 1004, the applet in the secure element 102 may receive and decrypt the encrypted request with the user's private key that was securely stored in the applet in the secure element 102 using the TSM. The applet may then retrieve the session key from the decrypted request and perform the requested operation. Assume, for example, the task requested of the secure element 102 is to check whether or not the password entered by the user is correct. Thus, when the applet in the secure element 102 determines that the password is correct, the applet may encrypt an affirmative response using the 128-bit random number session key that was received in the request and send the response to the mobile application 104. While the 128-bit random number used as a session key to encrypt the response payload minimizes the likelihood that an unauthorized person would be able to retrieve the user's private key using a brute force or rainbow attack or any other type of crypto attack, it is to be understood that embodiments of the invention are not limited to a 128-bit random number session key and may include any other suitable cryptographic key.

Referring once more to FIG. 1, at 1005, the applet in the secure element 102 may send the encrypted response to the mobile application 104. At 1006, upon receiving the encrypted response, the mobile application 104 may decrypt the response with the 128-bit random number session key that was stored on the mobile application 104 at 1002 above. After decrypting the response, the mobile application 104 has the affirmative response from the applet in the secure element 102 in the clear, and based on the response, the user's log-on request may be allowed. Alternatively, in the event of a negative response from the applet in the secure element 102, the user's log-on request may be denied. The mobile application 104 may close communication with the secure element 102 by encrypting, for example, a close communication command with the user's public key and sending the encrypted command to the applet in the secure element 102, at 1007.

While secure elements may be currently used primarily in NFC-enabled mobile device implementations, it is to be understood that embodiments of the invention are in no way limited to NFC implementations. It is to be further understood that embodiments of the invention may be employed in secure communications between mobile applications and secure elements in any and all types of mobile devices regardless of NFC implementation. Thus, embodiments of the invention employ a secure element as a component of any mobile device that is capable of encryption, decryption, and random number generation Currently, other products that purport to protect communications require that a private key be stored on the mobile application and/or that the communication must be initiated by the secure element. However, in embodiments of the invention, no private key is ever stored on the client application 104, and all communications between the mobile application 104 and the secure element 102 are initiated by the mobile application 104 instead of the secure element 102.

Figure 2:
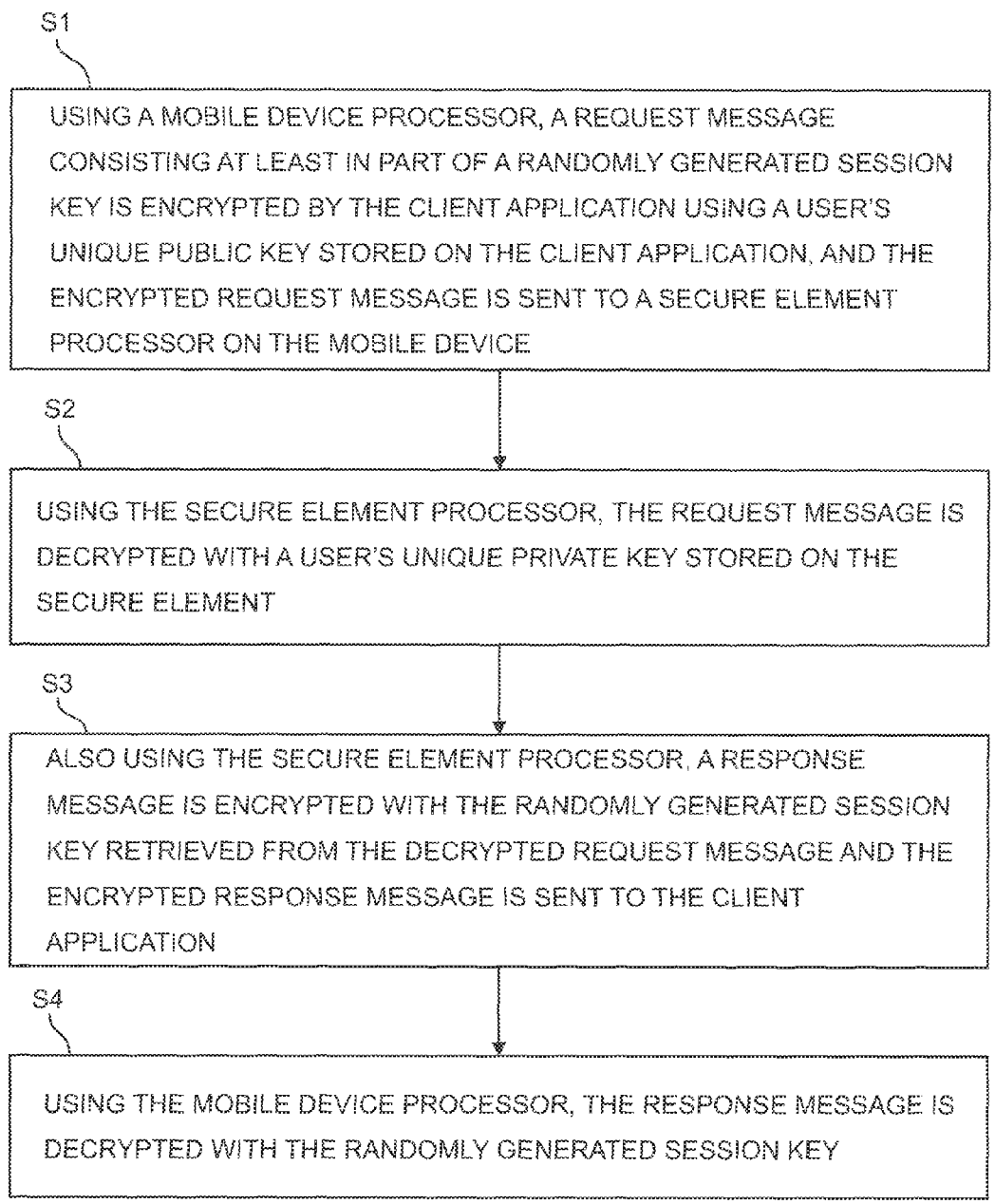
FIG. 2 is a flow chart that illustrates an example of the process of secure communication between a client application and a secure element in a mobile device for embodiments of the invention.

FIG. 2 is a flow chart that illustrates an example of the process of secure communication between a client application and a secure element in a mobile device for embodiments of the invention. Referring to FIG. 2, at S1, using a mobile device processor, a request message consisting at least in part of a randomly generated session key is encrypted by the client application using a user's unique public key stored on the client application, and the encrypted request message is sent to a secure element processor on the mobile device. At S2, using the secure element processor, the request message is decrypted with a user's unique private key stored on the secure element. At S3, also using the secure element processor, a response message is encrypted with the randomly generated session key retrieved from the decrypted request message, and the encrypted response message is sent to the client application. At S4, using the mobile device processor, the response message is decrypted with the randomly generated session key.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a Wide Area Network (WAN), a Local Area Network (LAN), a cellular network, or any other suitable network. Embodiments of the invention may employ client devices that may each comprise a computer-readable medium, including but not limited to, Random Access Memory (RAM) coupled to a processor. The processor may execute computer-executable program instructions stored in memory. Such processors may include, but are not limited to, a microprocessor, an Application Specific Integrated Circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a RAM. Such server devices, which may be a single computer system, may also be implemented as a network of computer processors. Examples of such server devices are servers, mainframe computers, networked computers, a processor-based device, and similar types of systems and devices.

What is claimed is:

1. A method for secure communication between a client application on a mobile device and a secure hardware element on the mobile device, comprising:

providing a physical tamper-resistant integrated circuit chip component of the mobile device, the physical tamper-resistant integrated circuit chip component comprising a secure hardware element having a secure element processor coupled to secure element memory;

storing, using the secure element processor, a unique user identifier and a user's unique private key on the mobile device only in the secure element memory on the secure hardware element of the mobile device;

storing, using a mobile device processor coupled to mobile device memory, the user's unique public key in the mobile device memory on the mobile device;

receiving, using the mobile device processor, entry of the unique user identifier and a request for user access to a client application on the mobile device processor on the mobile device;

encrypting, using the mobile device processor, a client application user access request message consisting at least in part of the entered unique user identifier and a randomly generated session key by the client application on the mobile device processor on the mobile device using the user's unique public key stored in the mobile device memory on the mobile device and sending the encrypted request message to the secure element processor on the mobile device;

decrypting, using the secure element processor, the client application user access request message by a secure element application on the secure hardware element on the mobile device with the user's unique private key stored on the mobile device only in the secure element memory on the secure hardware element on the mobile device;

comparing, using the secure element processor, the entered unique user identifier retrieved from the decrypted client application user access request message with the unique user identifier stored on the mobile device only in the secure element memory on the secure hardware element on the mobile device;

encrypting, using the secure element processor, a client application user access response message by the secure element application on the secure hardware element of the mobile device with the randomly generated session key retrieved from the decrypted request message and sending the encrypted response message to the client application on the mobile device processor on the mobile device; and decrypting, using the mobile device processor, the client application user access response message with the randomly generated session key by the client application on the mobile device processor on the mobile device.

2. The method of claim 1, wherein encrypting the request message using the user's unique public key further comprises encrypting the request message using the user's unique public key stored with the client application on the mobile device in advance of the secure communication.

3. The method of claim 1, wherein encrypting and sending the encrypted request message further comprises encrypting and sending a secure authentication request message to the secure element processor on the mobile device.

4. The method of claim 1, wherein encrypting and sending the encrypted request message further comprises encrypting and sending a secure password reset or password change request message to the secure element processor on the mobile device.

5. The method of claim 1, wherein encrypting and sending the encrypted request message further comprises encrypting and sending the encrypted request message in response to receiving entry of a user's action by the client application.

6. The method of claim 5, wherein encrypting and sending the encrypted request message in response to receiving entry of the user's action further comprises encrypting and sending the encrypted request message in response to receiving entry of a user's log-on request by the client application.

7. The method of claim 5, wherein encrypting and sending the encrypted request message in response to receiving entry of the user's action further comprises encrypting and sending the encrypted request message in response to receiving entry of the unique user identifier by the client application.

8. The method of claim 1, wherein encrypting and sending the request message consisting at least in part of the randomly generated session key further comprises generating and temporarily storing the randomly generated session key in memory of the mobile device by the client application.

9. The method of claim 8, wherein generating and temporarily storing the randomly generated session key further comprises generating and storing a random 128-bit number for use as the session key in memory of the mobile device by the client application.

10. The method of claim 1, wherein encrypting and sending the request message consisting at least in part of the randomly generated session key further comprises creating the request message consisting at least in part of the randomly generated session key, a request message payload, and a hash of the client application.

11. The method of claim 1, wherein sending the encrypted request message to the secure element processor further comprises sending the encrypted request message by the client application to an applet on the secure element processor.

12. The method of claim 1, wherein decrypting the request message with the user's private key further comprises decrypting the request message with the private key of a public-private key pair unique to the user stored on the secure element.

13. The method of claim 1, wherein decrypting the request message with the user's private key stored on the secure element further comprises decrypting the request message with the private key that was stored on the secure element using a trusted service manager.

14. The method of claim 13, wherein decrypting the request message with the private key stored on the secure element using the trusted service manager further comprises decrypting the request message with the private key that was stored on the secure element using the trusted service manager as a secure communication hub between the secure element and a financial institution.

15. The method of claim 1, wherein decrypting the request message with the user's private key stored on the secure element further comprises decrypting the request message with the user's unique private key for the particular user stored on the secure element along with a hash value of the client application binaries and a user's identifier.

16. The method of claim 1, wherein decrypting the request message with the user's private key stored on the secure element further comprises decrypting the request message with the user's private key stored on the secure element by an applet in the secure element.

17. The method of claim 1, wherein encrypting the response message with the randomly generated session key retrieved from the decrypted request message further comprises encrypting the response message with the randomly generated session key by an applet in the secure element.

18. The method of claim 1, wherein encrypting the response message with the randomly generated session key further comprises encrypting the response with a 128-bit randomly generated session key retrieved from the decrypted request message.

19. The method of claim 1, wherein sending the encrypted response message to the client application further comprises sending the encrypted response message to the client application on the mobile device processor by an applet on the secure element.

20. The method of claim 1, wherein decrypting the response message with the randomly generated session key further comprises decrypting the response message with the randomly generated session key temporarily stored by the client application in volatile memory of the mobile device.

21. The method of claim 1, wherein decrypting the response message further comprises decrypting an affirmative response message with the randomly generated session key and allowing a user's log-on request based on the affirmative response message.

22. The method of claim 1, wherein decrypting the response message further comprises decrypting a negative response message with the randomly generated session key and denying a user's log-on request based on the negative response message.

23. The method of claim 1, further comprising generating and encrypting a close communication command by the client application using the user's public key and sending the encrypted command to an applet in the secure element.

24. A system for secure communication between a client application on a mobile device and a secure hardware element on the mobile device, comprising:

a physical tamper-resistant integrated circuit chip component of the mobile device, the physical tamper-resistant integrated circuit chip component comprising a secure hardware element having a secure element processor coupled to secure element memory, the secure element processor being programmed for:

storing a unique user identifier and a user's unique private key on the mobile device only in the secure element memory on the secure hardware element on the mobile device;

a mobile device processor coupled to mobile device memory, the mobile device processor being programmed for:

storing the user's unique public key in the mobile device memory on the mobile device;

receiving entry of the unique user identifier and a request for user access to a client application on the mobile device processor on the mobile device;

encrypting a client application user access request message consisting at least in part of the entered unique user identifier and a randomly generated session key by the client application on the mobile device processor on the mobile device using the user's unique public key stored in the mobile device memory on the mobile device and sending the encrypted request message to the secure element processor on the mobile device;

the secure element processor being further programmed for:

decrypting the client application user access request message by a secure element application on the secure hardware element on the mobile device with the user's unique private key stored on the mobile device only in the secure element memory on the secure hardware element on the mobile device;

comparing the entered unique user identifier retrieved from the decrypted client application user access request message with the unique user identifier stored on the mobile device only in the secure element memory on the secure hardware element on the mobile device encrypting a client application user access response message by the secure element application on the secure hardware element of the mobile device with the randomly generated session key retrieved from the decrypted request message and sending the encrypted response message to the client application on the mobile device processor on the mobile device; and the mobile device processor being further programmed for:

decrypting the client application user access response message with the randomly generated session key by the client application on the mobile device processor on the mobile device.

\* \* \* \* \*